United States Patent [19]

King

[11] Patent Number: 5,101,434
[45] Date of Patent: Mar. 31, 1992

[54] VOICE RECOGNITION USING SEGMENTED TIME ENCODED SPEECH

[76] Inventor: Reginald A. King, Merrow Down, Woolstone, Faringdon, Oxon, Great Britain

[21] Appl. No.: 457,710
[22] PCT Filed: Sep. 1, 1988
[86] PCT No.: PCT/GB88/00718
§ 371 Date: Jan. 4, 1990
§ 102(e) Date: Jan. 4, 1990
[87] PCT Pub. No.: WO89/02146
PCT Pub. Date: Mar. 9, 1989

[30] Foreign Application Priority Data
Sep. 1, 1987 [GB] United Kingdom ............... 8720527

[51] Int. Cl.$^5$ ................................. G10L 7/08
[52] U.S. Cl. ......................................... 381/43
[58] Field of Search ........................ 381/41-46; 364/513.5

[56] References Cited

U.S. PATENT DOCUMENTS 3,679,830  7/1972  Uffelman et al. ................. 381/43
4,763,278  8/1988  Rajaskaran et al. ........... 364/513.5
4,783,807  11/1988 Marley ............................... 381/43
4,852,170  7/1989  Bordeaux .......................... 381/43

FOREIGN PATENT DOCUMENTS 0054365  6/1982  European Pat. Off. .
0119835  9/1984  European Pat. Off. .
0141497  5/1985  European Pat. Off. .
0173986  3/1986  European Pat. Off. .

OTHER PUBLICATIONS

Scarr, "Work Recognition Machine", Proc IEEE, vol. 117, No. 1, 1/70, pp. 203-212.
Itahashi, "Discrete Word Recognition Utilizing a Word Dictionary", IEEE Trans. Audio and Elect., vol. Au 21, No. 3, 8/73, pp. 239-248.

Primary Examiner—Dale M. Shaw
Assistant Examiner—Michelle Doerrler
Attorney, Agent, or Firm—Fleit, Jacobson, Cohn, Price, Holman & Stern

[57] ABSTRACT

A voice recognition system for time encoded speech (TES). The TES coded stream is divided into time frames. Each time frame is fed to a number of seeker circuits, each seeker circuit being optimized to detect an acoustic event of the voice signals, such as voiced or unvoiced events, amplitude or silence (ambient noise). Segmentation boundaries in the TES symbol stream are then determined from the acoustic events sensed as present or absent. These events are compared with stored events to determine the voice signals. By using this parallel comparison technique, comparison is made using distinct boundaries determined from the voice signal content and not by arbitrary boundaries which may contain acoustic events from, for example, more than one word in the voice signals. The implementation of the TES recognizer in low cost complimentary metal-oxide semiconductor (CMOS) technology makes this parallel comparison technique feasible at a reasonable cost.

20 Claims, 8 Drawing Sheets

FIG. 1A

"One"

FIG. 1B

"Three"

FIG. 2
TES CODE SYMBOLS

FIG. 3

| FIG. 9A | FIG. 9B | FIG. 9C |
|---|---|---|
| "Nine" | "Nine" | "Zero" |
| 94 100 100 | 100 99 100 | 10 100 100 |
| "Nine" 100 32 100 | "Zero" 100 99 90 | "Zero" 100 42 100 |
| 98 100 47 | 98 100 93 | 100 100 41 |
| OVERALL SCORE = 46 | OVERALL SCORE = 96 | OVERALL SCORE = 36 |

FIG. 4

COMPARISON OF SEGMENTED AND WHOLE WORD A MATRICES FOR THE WORD 'ZERO'

FIG. 6A
"Zero"

FIG. 6B
"Nine"

FIG. 7
SEGMENTATION DECISIONS FOR THE WORD 'ZERO'

FIG. 8

VOICE RECOGNITION USING SEGMENTED TIME ENCODED SPEECH

BACKGROUND OF THE INVENTION

The present invention relates to a method and apparatus for speech recognition.

Voice recognition systems are known. However, such systems, which operate on the principle of dividing the sounds into frequency bands by means of filters and then analysing the energy levels in each band, are relatively expensive. Furthermore, isolated word recognition systems based upon Time Encoded Speech (TES) which do not rely upon the principle of dividing the sounds into frequency bands, are also known.

A system and procedure for isolated word recognition using Time Encoded Speech is described in "Verification, Archetype Updating, and Automatic Token Set Selection, as a means of improving the performance of Menu Driven Isolated Word Recognition Systems using Time Encoded Speech Descriptors in High Acoustic Noise Backgrounds" by R. C. Power, R. D. Hughes and R. A. King; proceedings of International Conference Speech Input/Output Techniques and Applications (1986) pp 144–151.

TES is a form of speech waveform coding. The speech waveform is broken into time intervals (epochs) between sucessive real zeros. For each epoch of the waveform the code consists of a single digital word. This word is derived from two parameters of the epoch, its quantized time duration and its shape. The measure of duration is straightforward, and the commonly adopted strategy for shape description is to classify epochs on the basis of the number of positive minima or negative maxima occurring therein. For economical coding the number of naturally occurring distinguishable symbols produced by this process may then be mapped in a non-linear fashion onto a much smaller number (alphabet) of code descriptors. An algorithm to perform an initial TES coding is described in "Time Encoded Speech (TES) Descriptors as a Symbol Feature Set for Voice Recognition Systems, by J. Holbeche, R. D. Hughes and R. A. King, Proceedings of The International Conference Speech Input/Output Techniques and Applications (1986) pp 310–315.

Isolated word recognition systems based upon TES have many advantages over frequency division systems and are particularly advantageous in high ambient noise environments. However, such systems sometimes exhibit limitations in their ability to cope with connected or continuous word recognition tasks.

SUMMARY OF THE INVENTION

It will be appreciated, therefore, that there is a need for an improved voice recognition system based upon time encoded speech (TES) to cope with connected or continuous recognition tasks. It is an object of the present invention to provide an improved method and apparatus for recognising voice signals, and in particular, voice signals encoded as time encoded speech.

Accordingly, there is provided a method for recognizing voice signals encoded as time encoded speech (TES), the method comprising segmenting a time encoded speech symbol stream into a number of time frames and applying each time frame to a plurality of seeker circuits, each seeker circuit being optimized to detect an acoustic event of the voice signals to be recognized, examining parameters of TES symbols in the time frames thereby to determine the presence or absence of any acoustic event to which any seeker circuit is optimized, determining segmentation boundaries in the TES symbol stream in dependence upon the acoustic events determined as present or absent, comparing parameters of the TES symbol stream within the segmentation boundaries with archetypes of words or utterances stored as time encoded speech thereby to provide an output signal indicative of the nature of the voice signal.

In accordance with the present invention, there is also provided an apparatus for recognizing voice signals encoded as time encoded speech. The apparatus comprises receiver means for receiving a time encoded speech symbol stream and segmenting the stream into a number of time frames, a plurality of seeker circuits, arranged to receive the time frames and being optimized for detecting an acoustic event of the voice signals to be recognized, classifying means for examining parameters of time encoded speech symbols in the time frames and for determining the presence or absence of any acoustic event to which any seeker circuit is optimized, segmentation means for determining segmentation boundaries in the time encoded speech symbol stream, and comparator means for comparing parameters of the time encoded speech symbol stream within the segmentation boundaries with archetypes of words or utterances stored as time encoded speech, and output means for providing an output signal indicative of the nature of the voice signal as a result of the comparison.

Preferably, the segmentation boundaries comprise adjacent segmentation boundaries in the TES symbol stream.

DETAILED DESCRIPTION OF THE DRAWINGS

Figure 1A:
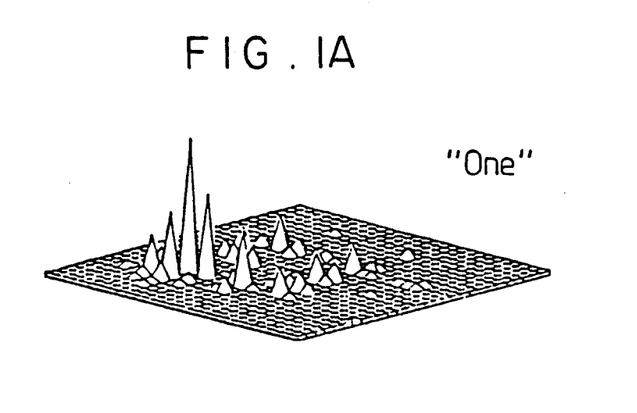
FIGS. 1A and 1B depict an A-Matrix two dimensional pattern recording of time encoded symbol distribution for a whole word archetypes "one" and "three".
Figure 1B:
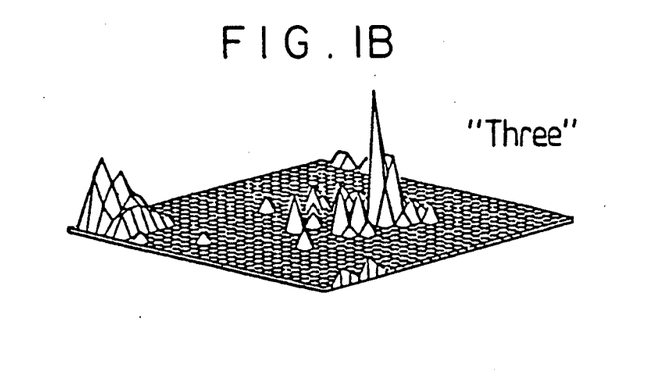

Isolated word recognition systems utilizing time encoded speech usually employ a time encoded speech based recognizer which forms whole word archetypes or templates from A-Matrices, as shown in FIGS. 1A and 1B. The A-Matrix representation of an utterance or acoustic event is a two dimensional pattern recording the second order TES symbol distribution, although higher dimensional models may also be employed.

The data obtained from each entire word to be recognized is merged into a single matrix and word comparisons are then conducted between the input word and stored archetypes, the stored archetypes being created, for example, during a training period. However, as previously stated, such systems may exhibit limitations in coping with connected or continuous recognition tasks as whole word comparisons are made.

Figure 3:
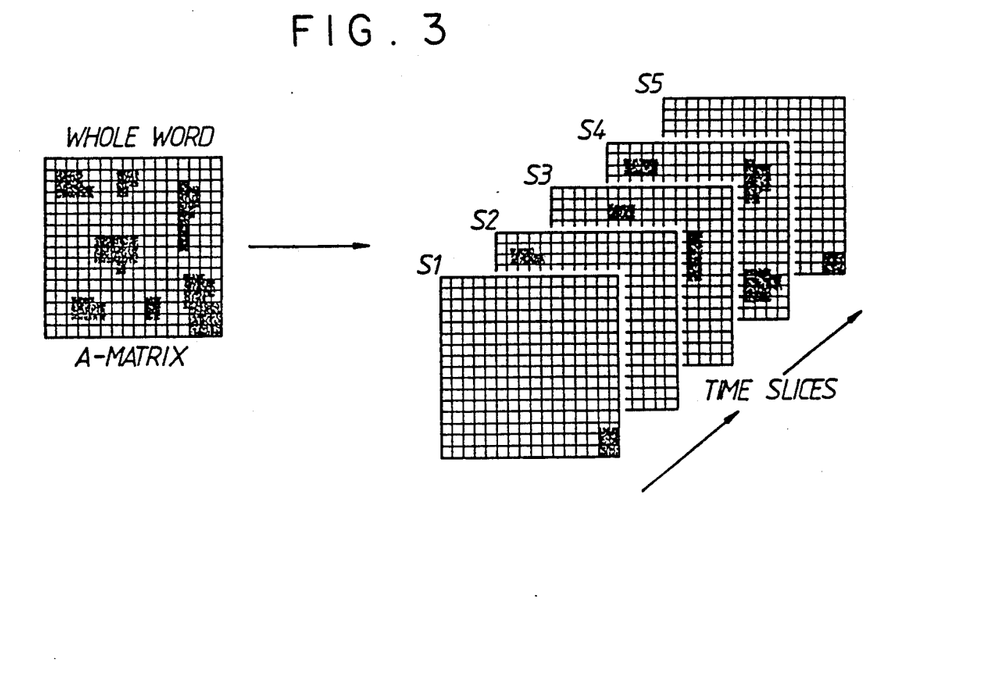
FIG. 3 shows a comparison of whole work and segmentation matrices for the same entire word.
Figure 4:
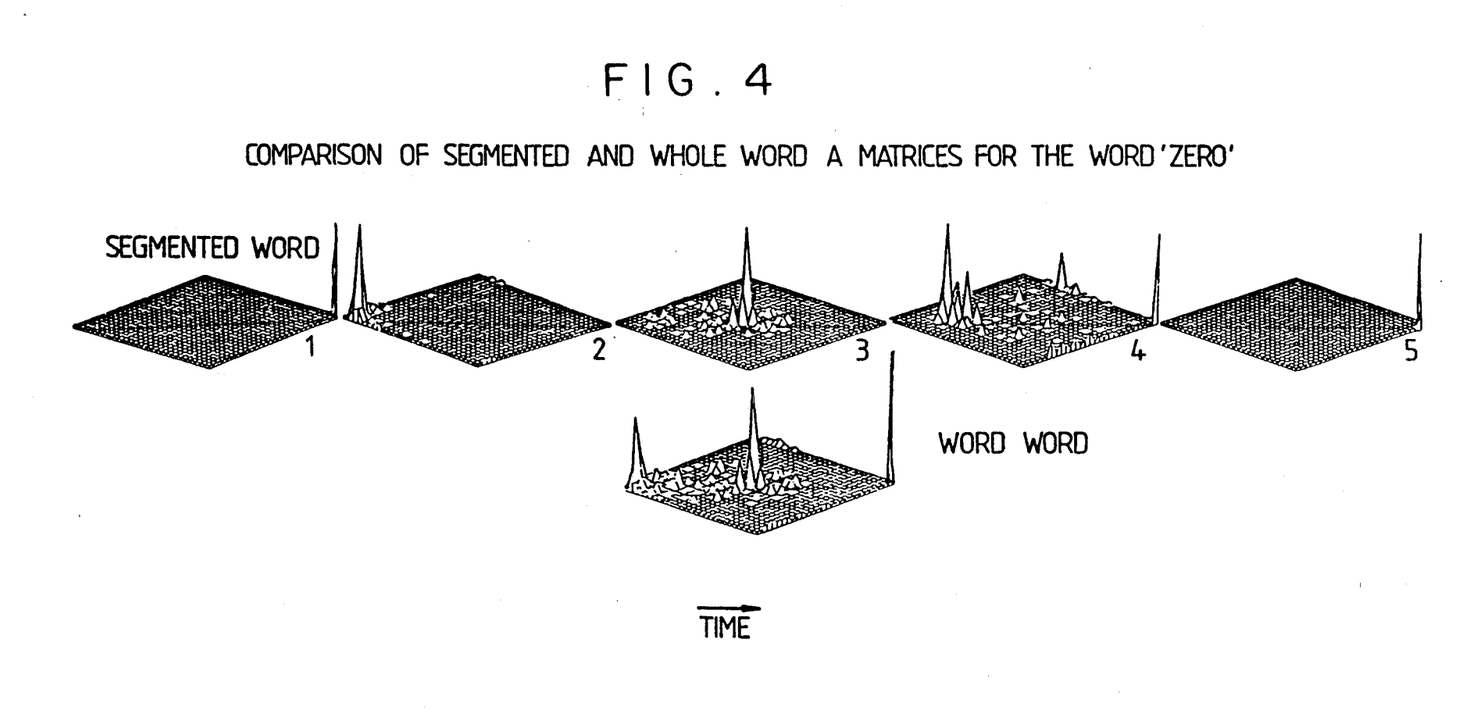
FIG. 4 depicts a graphical representation of the whole word and segmentation matrices shown in FIG. 3.

From an examination of the many options available for implementing continuous word recognition TES systems, it has been realized that the TES symbols stream may be divided into regions or segments defined by segmentation boundaries wherein the TES symbol distribution remains reasonably static. By adopting such segmentation procedures a small number of well populated 'A' or higher order matrices in chronological order may be formed which can be used as a basis for continuous word recognition. Examples of such chronological matrices in comparison with an A-Matrix for the same entire word are shown in FIG. 3, with a graphical representation of the TES symbol distribution for the segmented and wholeword matrices being shown in FIG. 4.

Figure 2:
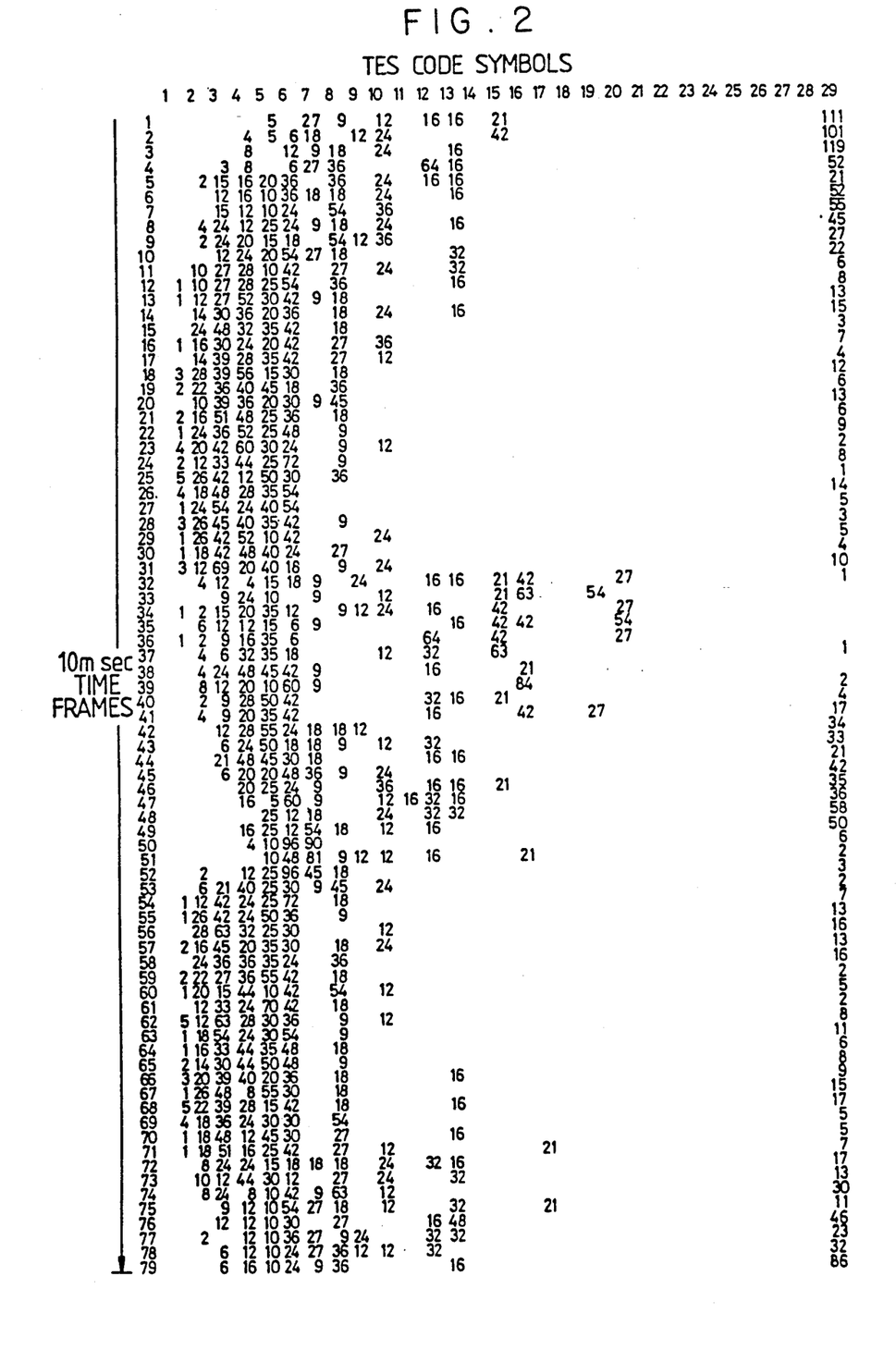
FIG. 2 shows the time encoded speech symbol distribution for the word 'six'.

Referring to FIG. 2, there is shown the TES code distribution for the word "six", with the TES code divided into 10 millisecond time frames, numbered 1 to 79. In this TES description of the word "six", each time frame is represented not as an A-Matrix but a simple first order frequency distribution across the possible 29 possible TES code symbols. In this example, symbol 29 is a special symbol reserved for epochs of a lower amplitude than a preset threshold, intended to represent silence. It can be seen from this example that in this form the speech divides fairly naturally into segments of broadly similar TES code distribution, some of which are as long as 300 millisecond duration, from which A-Matrices may be formed. In the present invention A or higher order Matrices are formed from relatively similar TES code distribution to achieve continuous word recognition by word comparison with known archetypes using, for example, Dynamic Time Warping or Dymanic Programming Techniques. These terms will not be described in the present specification as it is considered they are understood by persons skilled in the art of voice coding and recognition.

Figure 5:
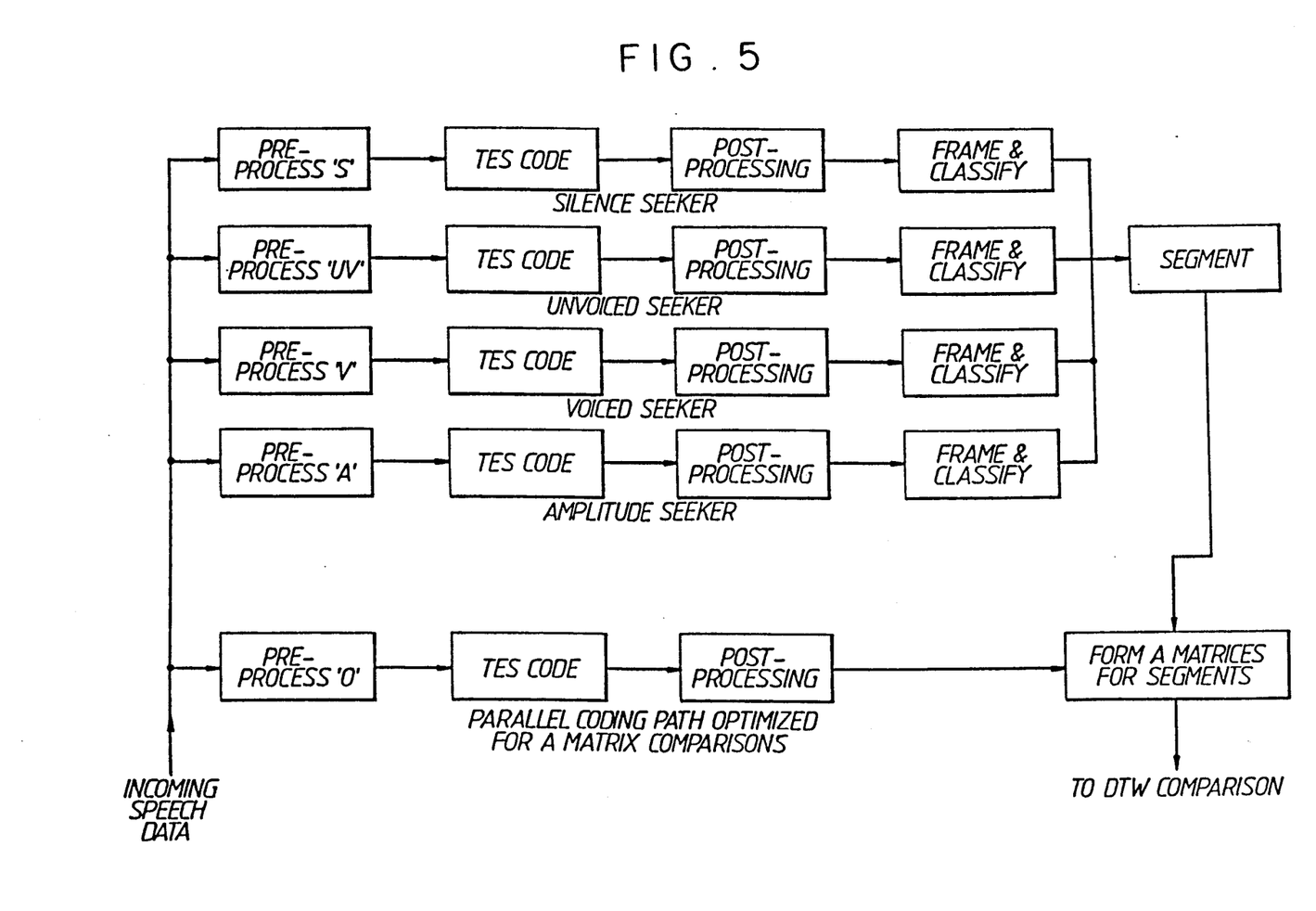
FIG. 5 shows an apparatus for continuous word recognition in accordance with the present invention.

In the presently described embodiment of the present invention the segmentation of the TES symbol stream into segments of relatively similar TES code distribution is achieved by using a plurality of independent seeker circuits coupled in parallel, as shown in FIG. 5. Each seeker circuit is optimized to detect an acoustic event of the voice signals to be recognized, such as voice and unvoiced acoustic events, silence or amplitude. Furthermore, pre-processing techniques may be adopted for the voice signals before decisions are made on the various classes of acoustic event. For example, the signal may be differentiated before coding for the "unvoiced" events so as to emphasise any high frequencies present. Alternatively, or additionally, the voice signals may be integrated before coding for the voiced seeker circuit so as to amplify any low frequency components present. Furthermore, a range of numerical filtering options post coding may be utilized to improve the ability of the seeker circuits to classify consistently the incoming voice signal.

Each seeker circuit is arranged to operate in accordance with a classification algorithm. The input signal to each seeker circuit comprises a string of TES symbols which is segmented into fixed length time frames of, for example, 10–20 milliseconds, as shown in FIG. 2. The TES symbol distribution of each time frame is examined to provide a simple dichotomised decision i.e. is the acoustic event to which any seeker circuit is optimized "present" or "absent".

Figure 6A:
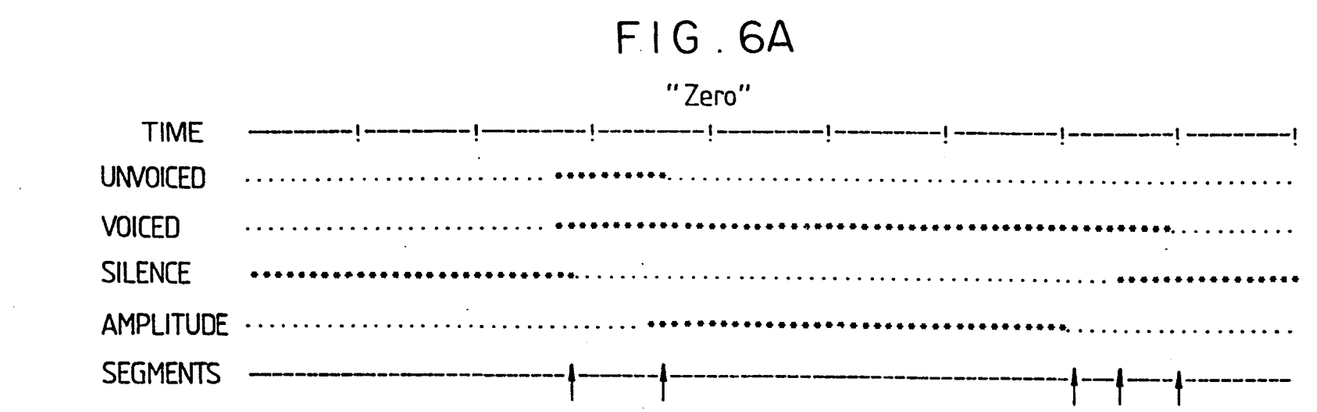
FIGS. 6A and 6B show examples of segmentation of the words "zero" and "nine" in accordance with the method of the present invention.
Figure 6B:
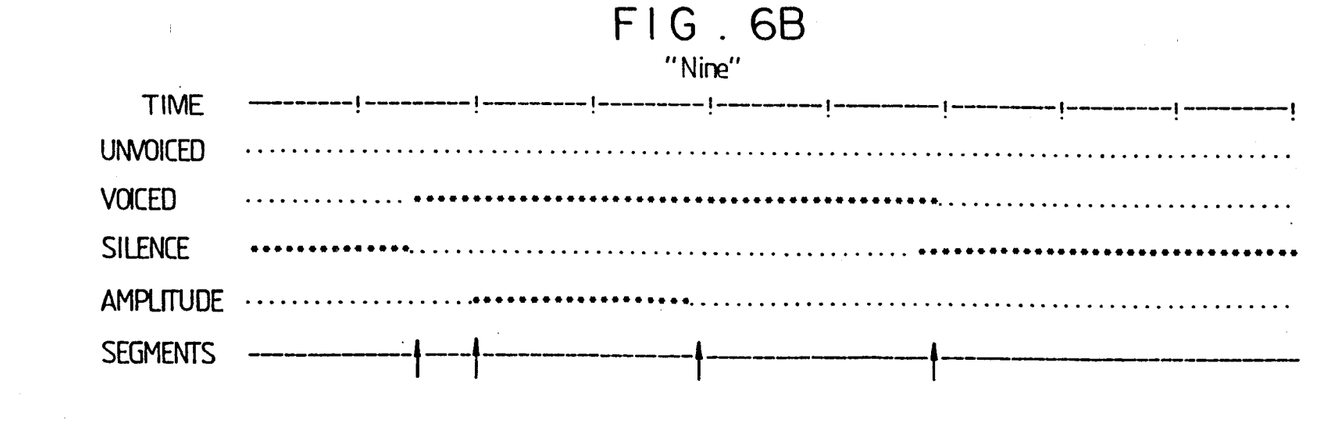

The output from each seeker circuit is a binary coded signal, the result of each time frame being true if the time frame is considered to contain the acoustic parameter to which a seeker circuit is optimized and therefore, of the type sought. A segmentation algorithm is then employed which acts upon the coded output signals of the seeker circuits and decides where to place the segmentation boundaries in the TES symbol stream from which the A-Matrices are formed. A relatively simple algorithm may be used for this purpose which, for example, may operate by searching for regions of consistent contiguous descriptors and placing segmentation boundaries between them with, preferably, a minimum length being placed on the length of any segment. FIGS. 6A and 6B show an example of segmentation for the words "zero" and "nine".

Figure 7:
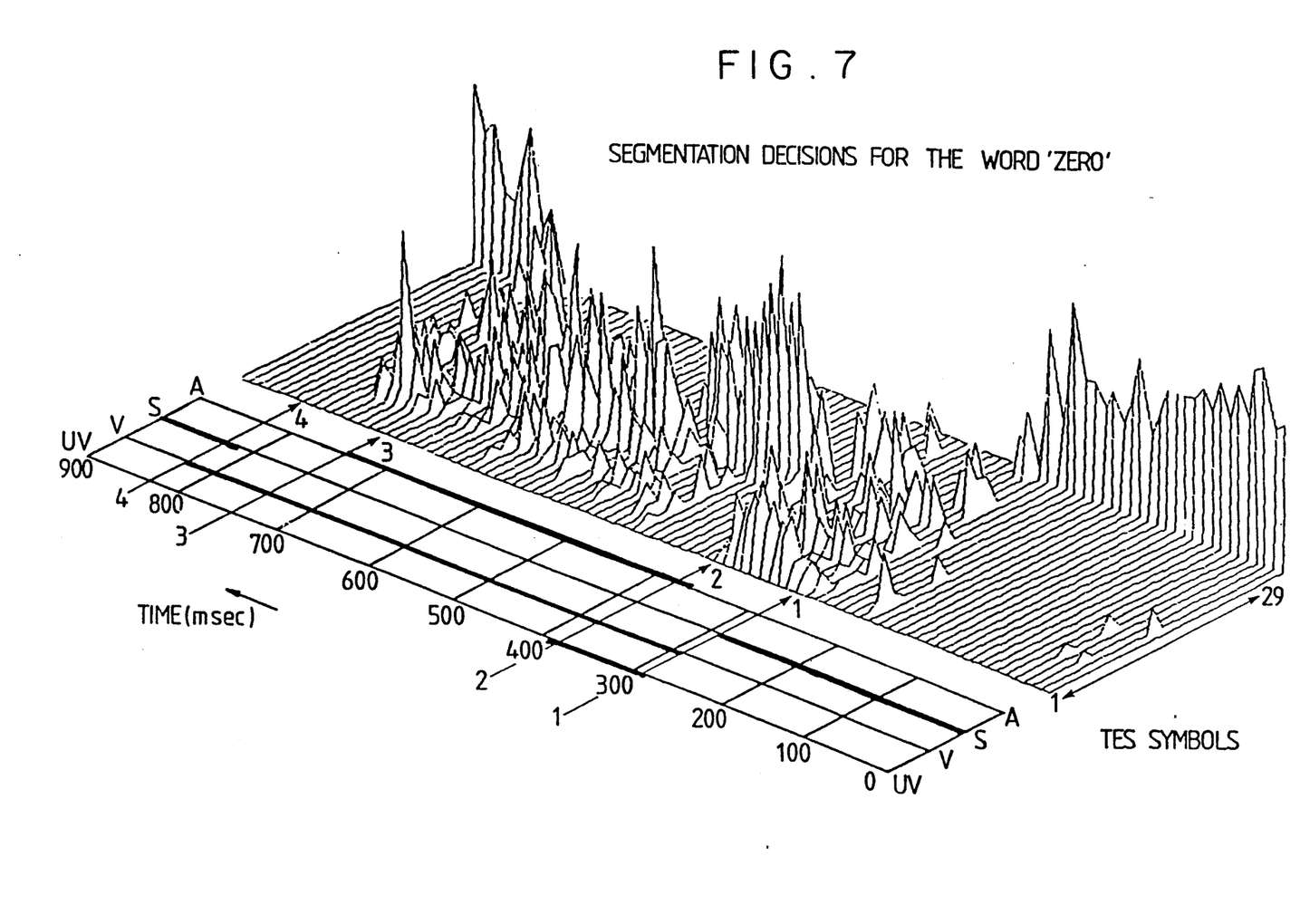
FIG. 7 shows a graphic representation of the temporal distribution of the time encoded speech symbols for the word "zero"

FIG. 7 shows a graphic representation of the temporal distribution of the TES symbols for the word 'Zero' in which the boundaries of the acoustic events occuring within this spoken word are clearly illustrated and from which the segmentation decisions are determined.

Simultaneously with the segmentation process a separate coding path optimized for the final comparison of A-Matrices, is examined. An A-Matrix is compiled for the current segment and, as soon as a segmentation boundary is decided upon, the matrix is closed and data is entered into the next. The final result is a series of A-Matrices representing variable time slices throughout the utterance. The duration of each segment is stored, together with its A-Matrix descriptor.

Having compiled the A-Matrices for each utterance, a comparison is carried out between the unknown utterance and the archetypes for the known words. At present, these archetypes are formed from single utterances of each word, but matching routines may be adopted to allow more than one word to be merged.

One comparison routine, Dynamic Time Warping, is, basically a simple approach using a distance score defined as:

$$D(A,B) = 100 \cdot 1 - \frac{\left(\sum_{i=1}^{29}\sum_{j=1}^{29} a_{i,j} b_{i,j}\right)^2}{\sum_{i=1}^{29}\sum_{j=1}^{29} a_{i,j}^2 \sum_{i=1}^{29}\sum_{j=1}^{29} b_{i,j}^2}$$

where $A = a_{i,j}$, $B = b_{i,j}$ are the A-Matrices to be compared.

Figure 8:
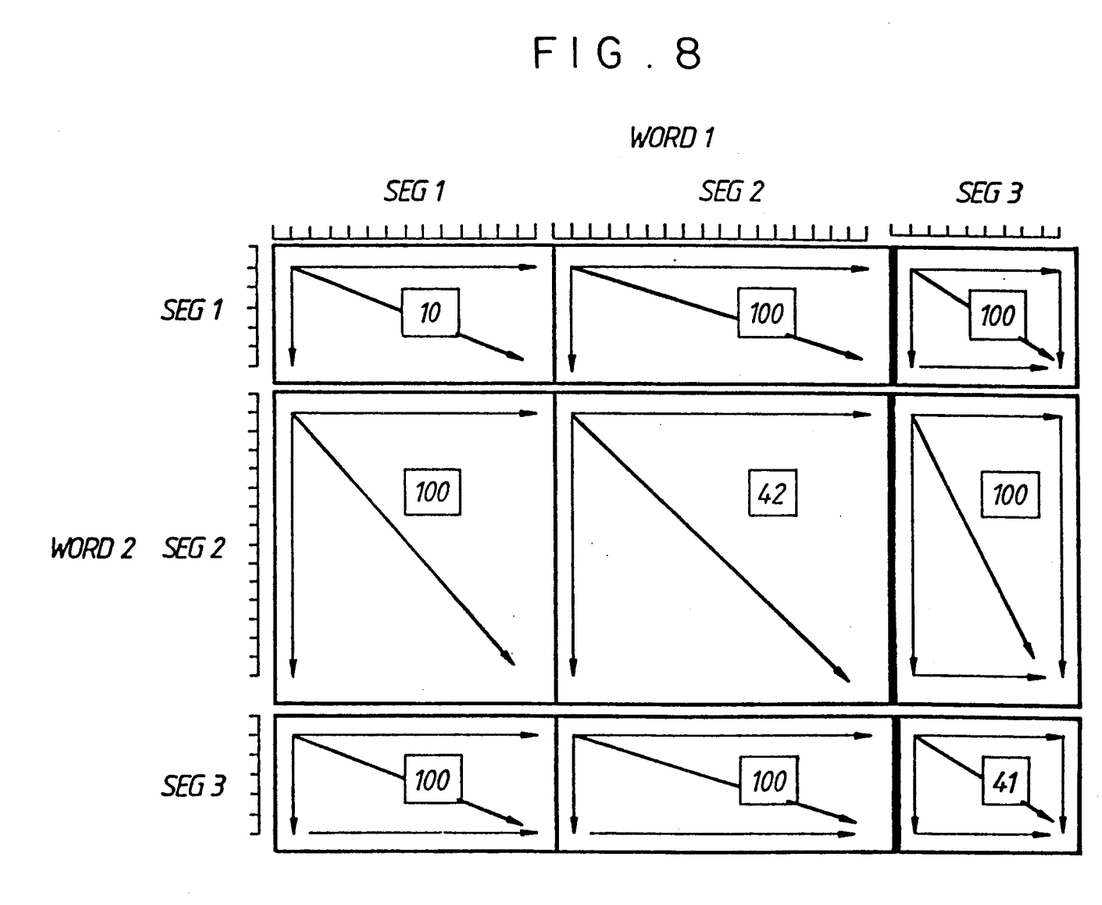
FIG. 8 shows a comparison between two words using dynamic time warping techniques.

An example of word comparison based upon Dynamic time warping, in which the silence segments at each end of the compared words have been omitted for clarity, is shown in FIG. 8. The variable length of the segments introduces an unusual complication, which may be addressed by weighting the cumulative minimum distances calculated across the matching table by the durations of the segments under consideration.

Figure 9A:
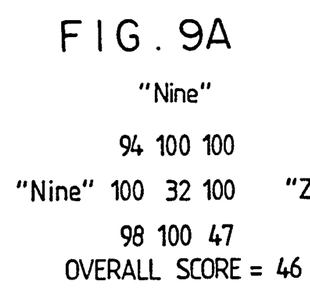
FIGS. 9A, 9B and 9C show matrices of dynamic programming distance scores for various atterances.
Figure 9B:
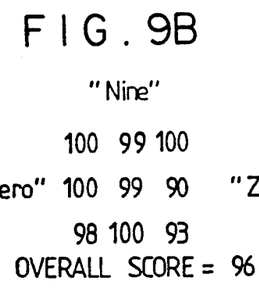
Figure 9C:
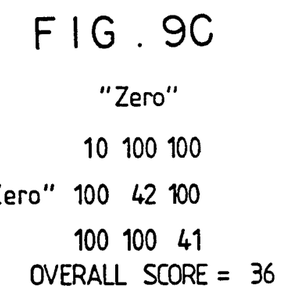

FIGS. 9A, 9B and 9C show some examples of comparison matrices.

The improvements obtained by adopting the principles of the present invention can be seen from Table 1 in the Appendix which shows an example of comparing single utterances by the segmentation routine and the whole word routine. The utterances were spoken by the same male speaker in a computer room environment. The results show that the segmentation algorithm is capable of discriminating between similar words which are confused by a whole word approach. The utterance of "nine" was confused with "niner" by the whole word routine, but correctly classified by the segmentation routine. Similarly the utterance of "fix" shows superior discrimination against "six" and "seven" when compared by the segmentation algorithm. Results such as these indicate recognition scores with the first immature segmentation and comparison algorithms are of the same order of magnitude as with whole word matching. The distribution of errors is however different.

The TES coder devices and seeker circuits may be implemented using LSI CMOS technology. It will be realized therefore, that such parallel processing techniques may be achieved at very low cost when compared to single channel spectral division recognisers.

Although the present invention has been described with respect to a particular embodiment, it should be understood that modifications may be effected within the scope of the invention. For example, additional seeker circuits may be employed, each optimized to a particular parameter of the voiced or unvoiced acoustic events. Furthermore, segmentation and comparison routines other than those described may also be employed. Additionally, comparison between the temporal A Matrices and the stored achetypes may be achieved other than by direct comparison of TES symbols. Any parameter of the TES coded symbols may be employed for comparison. Symbol event descriptors may be used, which may comprise groups of TES symbols in any combination, or derivatives of TES symbols, or any combination of the above. Alternatively, the relationship between the trajectory followed in the matrices by a set of parameters may be used.

TABLE 1

| APPENDIX | | | | | | | | | | | |
|---|---|---|---|---|---|---|---|---|---|---|---|
| | '0' | '1' | '2' | '3' | '4' | '5' | '6' | '7' | '8' | '9' | '9er' | 'fix' |
| Segmented | | | | | | | | | | | |
| '9' | 96 | 98 | 96 | 85 | 99 | 73 | 99 | 79 | 93 | 46 | 72 | 99 |
| 'fix' | 82 | 100 | 90 | 81 | 89 | 72 | 49 | 92 | 49 | 98 | 88 | 38 |
| Whole Word | | | | | | | | | | | |
| '9' | 94 | 95 | 57 | 56 | 89 | 56 | 91 | 85 | 46 | 51 | 49 | 84 |
| 'fix' | 67 | 100 | 58 | 50 | 93 | 72 | 13 | 15 | 47 | 97 | 93 | 10 |

Table 1: Overall Distance Scores For Two Utterance Sets Using The Segmentation And Whole Word Algorithms

I claim:

1. A method of recognizing voice signals encoded as time encoded speech, the method comprising the steps of:
    segmenting a time encoded speech symbol stream into a number of time frames and applying each time frame to a plurality of seeker circuits, each seeker circuit being optimized to detect an acoustic event of the voice signals to be recognized,
    examining the time encoded speech symbols by means of the seeker circuits in the time frames to determine the presence or absence of any acoustic event to which any seeker circuit is optimized,
    determining segmentation boundaries in the time encoded speech symbol stream in dependence upon the acoustic events determined as present or absent, and
    comparing the time encoded speech symbol stream within the segmentation boundaries with archetypes of words or utterances stored as time encoded speech to generate an indication of the nature of the voice signal.

2. A method according to claim 1 wherein the segmentation boundaries comprise adjacent segmentation boundaries in the time encoded speech symbol stream.

3. A method according to claim 1 wherein an acoustic event of the voice signals to which at least one seeker circuit is optimized comprises silence.

4. A method according to claim 1 wherein an acoustic event of the voice signals to which at least one seeker circuit is optimized comprises amplitude.

5. A method according to claim 1 wherein an acoustic event of the voice signals to which at least one seeker circuit is optimized comprises voice events.

6. A method according to claim 1 wherein an acoustic event of the voice signals to which at least one seeker circuit is optimized comprises unvoiced events.

7. A method according to claim 6 wherein the voice signals are differentiated before being processed by the seeker circuits to emphasize any high frequency component of the voice signals.

8. A method according to claim 6 wherein the voice signals are integrated before being processed by the seeker circuits to emphasize any low frequency component of the voice signals.

9. A method according to claim 8 and further comprising the step of arranging each seeker circuit to operate in accordance with a classification algorithm whereby each seeker circuit searches for regions of consistent contiguous acoustic events in the time encoded symbol stream such that the segmentation boundaries are placed between such regions to define segments in the time encoded symbol stream and wherein the length of any segment so determined exceeds a predetermined minimum length.

10. A method according to claim 9 and further comprising the steps of providing a matrix to be compiled for any segment being determined in the time encoded symbol stream, and, generating acoustic events for each matrix to identify each matrix, and data relating to the length of each segment being stored with its corresponding acoustic event.

11. A method according to claim 10 wherein the step of comparing the time encoded speech symbol stream with the archetypes stored as time encoded speech comprises dynamic time warping.

12. A method according to claim 11 wherein in the step of comparing, each segment is weighted in dependence upon its duration.

13. A method according to claim 12 wherein the step of comparing comprises comparing symbol event descriptors with the archetypes of words or utterances.

14. A method according to claim 13 wherein the symbol event descriptors comprise groups of time encoded symbols, in any combination.

15. A method according to claim 13 wherein the symbol event descriptors comprise derivatives of the time encoded symbols.

16. A method according to claim 13 wherein the symbol event descriptors comprise in combination, derivatives of time encoded symbols and time encoded symbols or groups of time encoded symbols.

17. Apparatus for recognizing voice signals encoded as time encoded speech symbols, the apparatus comprising:
  receiver means for receiving a time encoded speech symbol stream and segmenting the stream into a number of time frames,
  a plurality of seeker circuits, arranged to receive the time frames and being optimized for detection of an acoustic event of the voice signals to be recognized,
  classifying means for examining the time encoded speech symbols in the time frames and for determining the presence or absence of any acoustic event to which any seeker circuit is optimized,
  segmentation means for determining segmentation boundaries in the time encoded speech symbol stream,
  means for storing archetypes of words or utterances stored as time encoded speech,
  comparator means for comparing the time encoded speech symbol stream within the time frames with archetypes of words or utterances stored as time encoded speech, and
  output means for providing an output signal indicative of the voice signal as a result of the comparison.

18. Apparatus according to claim 17, and further comprising processing means operable on the time frames received by the seeker circuits for emphasizing any low frequency contents of the voice signals to be recognized.

19. Apparatus according to claim 17, and further comprising processing means operable on the time frames received by the seeker circuits for emphasizing any high frequency contents of the voice signals to be recognized.

20. Apparatus according to claim 17 18 or 19 wherein the seeker circuits comprise integrated circuit devices.

* * * * *